United States Patent
Lin et al.

(10) Patent No.: US 8,000,964 B2
(45) Date of Patent: Aug. 16, 2011

(54) METHOD OF CONSTRUCTING MODEL OF RECOGNIZING ENGLISH PRONUNCIATION VARIATION

(75) Inventors: Jui-Tang Lin, Tainan County (TW); Chin-Shun Hsu, Kaohsiung (TW); Shen-Yen Chai, Tainan (TW); Chung-Hsien Wu, Tainan (TW); Kuei-Ming Lee, Changhua County (TW); Chia-Hsin Hsieh, Tainan (TW); Chien-Lin Huang, Kaohsiung (TW)

(73) Assignee: Institute for Information Industry, Taipei (TW)

( * ) Notice: Subject to any disclaimer, the term of this patent is extended or adjusted under 35 U.S.C. 154(b) by 781 days.

(21) Appl. No.: 12/034,842

(22) Filed: Feb. 21, 2008

(65) Prior Publication Data

US 2009/0157402 A1   Jun. 18, 2009

(30) Foreign Application Priority Data

Dec. 12, 2007   (TW) ............................ 96147548 A

(51) Int. Cl.
*G10L 15/04* (2006.01)
(52) U.S. Cl. ...................................... 704/251
(58) Field of Classification Search .......... 704/236–240, 704/251
See application file for complete search history.

(56) References Cited

U.S. PATENT DOCUMENTS

| | | | | |
|---|---|---|---|---|
| 6,236,965 B1* | 5/2001 | Kim et al. | ...................... | 704/254 |
| 6,389,394 B1* | 5/2002 | Fanty | ........................... | 704/249 |
| 6,434,521 B1* | 8/2002 | Barnard | ........................ | 704/244 |
| 7,181,395 B1* | 2/2007 | Deligne et al. | ................. | 704/249 |
| 7,310,600 B1* | 12/2007 | Garner et al. | ................. | 704/234 |
| 2002/0087317 A1* | 7/2002 | Lee et al. | ........................ | 704/257 |
| 2002/0111805 A1* | 8/2002 | Goronzy et al. | .............. | 704/250 |
| 2002/0173966 A1* | 11/2002 | Henton | ........................... | 704/277 |
| 2004/0148161 A1* | 7/2004 | Das et al. | ........................ | 704/224 |
| 2006/0020462 A1* | 1/2006 | Reich | ............................. | 704/254 |
| 2006/0143008 A1* | 6/2006 | Schneider et al. | ............. | 704/251 |
| 2006/0224384 A1* | 10/2006 | Dow et al. | ...................... | 704/257 |

OTHER PUBLICATIONS

Liu et al. "Partial Change Accent Models for Accented Mandarin Speech Recognition", Proc. IEEE, ASRU workshop, 2003.*
Goronzy: Robust Adaptation to Non-native Accents, LNAI 2560, pp. 79-104, Springer-Verlag Berlin Heidelberg 2002.*

(Continued)

*Primary Examiner* — James S. Wozniak
*Assistant Examiner* — Jialong He
(74) *Attorney, Agent, or Firm* — Tim Tingkang Xia; Morris, Manning & Martin, LLP

(57) ABSTRACT

A method of constructing a model of recognizing English pronunciation variations is used to recognize English pronunciations with different intonations influenced by non-English native languages. The method includes collecting a plurality of sound information corresponding to English expressions; corresponding phonetic alphabets of the non-English native language and English of a region to International Phonetic Alphabets (IPAs), so as to form a plurality of pronunciation models; converting the sound information with the pronunciation models to form a pronunciation variation network of the corresponding English expressions, thereby detecting whether the English expressions have pronunciation variation paths; and finally summarizing the pronunciation variation paths to form a plurality of pronunciation variation rules. Furthermore, the pronunciation variations are represented by phonetics features to infer possible pronunciation variation rules, which are stored to form pronunciation variation models. The construction of the pronunciation variation models enhances applicability of an English recognition system and accuracy of voice recognition.

18 Claims, 18 Drawing Sheets

OTHER PUBLICATIONS

Huang et al. "Accent Issues in Large Vocabulary Continuous Speech Recognition", International Journal of Speech Technology 7, 141-153, 2004.*

Xu et al. "Survey of Clustering Algorithms", IEEE Transactions on Neural Networks, vol. 16, No. 3, May 2005.*

* cited by examiner

| Incorrect aspect | Example |
|---|---|
| /ɑ/->/o/ | Tom、John |
| /z/->/s/ | days、husband |
| /ɔ/->/s/ | wrong、corporate |
| /aɪ/->/ɪ/ | crisis、diversity |
| /æ/->/ɑ/ | staff、as |

FIG. 1A
(PRIOR ART)

| | Incorrect aspect | Example |
|---|---|---|
| A short vowel replaces a long vowel | /i/->/ɪ/ | seat、neet |
| | /e/->/ɛ/ | taken、made |
| | /u/->/ʊ/ | fool |
| | /o/->/ɔ/ | gold |
| A long vowel replaces a short vowel | /ɪ/->/i/ | fool |
| | /ɛ/->/e/ | year |
| | /ʊ/->/u/ | weather、next |
| | /ɔ/->/o/ | full、good |
| /ɛ/replaces/æ/ | /æ/->/ɛ/ | pan、matter |
| /ɑ/replaces/ʌ/ | /ʌ/->/ɑ/ | husband、funny |

FIG. 1B
(PRIOR ART)

|  | Incorrect aspect | Example |
|---|---|---|
| A non-retroflex sound replaces a retroflex sound | /θ/–>/s/ | th<u>a</u>nk、th<u>i</u>nk |
|  | /ð/–>/l/or/d/ | <u>th</u>is、<u>th</u>em |
| /ə/ replaces a coda /r/ | /r/–>/ə/ | the<u>r</u>e、clea<u>r</u> |
| /n/ replaces /ŋ/ | /ŋ/–>/n/ | goi<u>ng</u> |
| /r/ following a vowel is omitted | /r/–>x | a<u>r</u>e、wa<u>r</u>m |
| /l/ following a vowel is omitted | /l/–>x | a<u>l</u>most、goa<u>l</u> |
| /n/ following a vowel is omitted | /n/–>x | mi<u>n</u>e、o<u>n</u>e |
| the coda of a stop is omitted | /d/–>x | stupi<u>d</u> |
|  | /t/–>x | brough<u>t</u> |
|  | /k/–>x | thin<u>k</u> |
| /ə/ is added to a stop | /d/–>/də/ | stupi<u>d</u> |
|  | /t/–>/tə/ | studen<u>t</u> |
|  | /k/–>/kə/ | lin<u>k</u> |

FIG. 1C
(PRIOR ART)

6139 ATTEBURY    AE1 T B EH0 R IY0
6140 ATTEMPT     AH0 T EH1 M R T
6141 ATTEMPTED   AH0 T EH1 M P T AH0 D
6142 ATTEMPTING  AH0 T EH1 M P T IH0 NG
6143 ATTEMPTS    AH0 T EH1 M P S
6144 ATTEMPTS(2) AH0 T EH1 M P S
6145 ATTENBOROUGH AE1 T AH2 N B ER0 OW0
6146 ATTEND      AE0 T EH1 N D
6147 ATTENDANCE  AE0 T EH1 N D AH0 N S
6148 ATTENDANT   AE0 T EH1 N D AH0 N T
6149 ATTENDANTS  AE0 T EH1 N D AH0 N T S

FIG. 3

| Pronunciation type | corresponding English |
|---|---|
| Voiced plosive | B, D, G |
| Unvoiced plosive | P, T, K |
| Fricatives | F,S,SH,H,X,V,TH,DH |
| Affricatives | Z,ZH,C,CH,J,Q,CH,JH |
| Nasals | M,N,NG |
| Liquids | R,L |
| Front vowels | W,Y |
| Central vowels | I,ER,V,EI,IH,EH,AE |
| Back rounded vowels | O |
| Back unrounded vowels | A,U,OU,AI,AO,E,EE,OY,AW |

FIG. 6

| Phone confusion matrix | # | i_M | er_M | v_M | ei_M | IH | EH | AE | eng_M | an_M | ang_M | en_M | AH | UH | o_M | u_M | a_M | ou_M | ai_M | e_M | ee_M | ao_M | OY | AW | b_M | d_M | g_M |
|---|---|---|---|---|---|---|---|---|---|---|---|---|---|---|---|---|---|---|---|---|---|---|---|---|---|---|---|
| # | S | A | . | A | A | A | A | . | . | . | . | . | A | . | . | A | . | . | . | A | A | . | . | . | . | . | . |
| i_M | A | T | A | A | A | B | B | A | A | A | A | A | A | A | A | A | A | A | A | A | . | A | A | A | A | A | A |
| er_M | A | A | T | . | A | A | B | . | A | A | A | A | A | A | A | A | A | A | A | A | A | A | A | . | . | A |
| v_M | A | A | A | T | A | A | A | A | A | A | A | A | A | A | A | A | A | A | A | A | A | A | A | A | A | A |
| ei_M | A | A | A | A | T | A | A | A | A | A | A | A | A | A | A | A | A | A | A | A | A | A | . | . | A | A |
| IH | A | B | A | A | A | M | A | A | A | A | A | A | A | . | A | A | . | A | A | A | A | . | A | A | A | A |
| EH | . | A | B | . | A | A | A | A | K | C | A | A | A | A | A | A | A | A | A | . | A | A | A | A | A | A |
| AE | A | A | A | A | A | A | C | L | A | A | A | A | A | A | A | A | A | A | A | A | A | A | A | A | A | A |
| eng_M | A | A | A | A | A | A | A | A | T | A | A | A | A | A | A | A | A | A | A | A | A | A | . | A | A | A |
| an_M | A | A | A | A | A | . | A | A | A | O | A | A | A | A | A | A | A | A | A | . | A | A | . | A | A | A |
| ang_M | . | A | A | . | A | . | A | A | A | A | P | A | A | A | . | A | A | A | A | A | A | A | A | A | A | A |
| en_M | A | A | A | A | A | A | A | A | A | A | A | T | F | A | A | A | A | A | A | B | A | A | A | A | A | A |
| AH | . | A | A | A | A | A | A | A | A | . | A | A | F | T | A | A | A | A | A | A | A | A | . | A | A | A |
| UH | A | A | A | A | A | A | A | . | A | . | . | A | A | . | A | A | A | A | A | A | A | A | A | A | A | . |

FIG. 7

| | |
|---|---|
| 6139 ATTEBURY | AE1 T B EH0 R IY0 |
| 6140 ATTEMPT | AH0 T EH1 M R T |
| 6141 ATTEMPTED | AH0 T EH1 M P T AH0 D |
| 6142 ATTEMPTING | AH0 T EH1 M P T IH0 NG |
| 6143 ATTEMPTS | AH0 T EH1 M P S |
| 6144 ATTEMPTS(2) | AH0 T EH1 M P S |
| 6145 ATTENBOROUGH | AE1 T AH2 N B ER0 OW0 |
| 6146 ATTEND | AE0 T EH1 N D |
| 6147 ATTENDANCE | AE0 T EH1 N D AH0 N S |
| 6148 ATTENDANT | AE0 T EH1 N D AH0 N T |
| 6149 ATTENDANTS | AE0 T EH1 N D AH0 N T S |

| | | |
|---|---|---|
| 16 | sil-n_M-ai_M | 3248 |
| 17 | n_M-ai_M-n_M | 2889 |
| 18 | ai_M-n_M-sil | 2990 |
| 19 | sil-W-AH | 3432 |
| 20 | W-AH-n_M | 3239 |
| 21 | sil-TH-r_M | 2244 |
| 22 | TH-r_M-i_M | 2020 |
| 23 | r_M-i_M-sil | 4266 |
| 24 | AH-n_M-t_M | 5354 |
| 25 | n_M-t_M-i_M | 2012 |
| 26 | t_M-i_M-sil | 5974 |

FIG. 8

| Phonetic alphabet | p | k | t | b | d | g | f | s | sh | v | z | m | n | ng | l | r | w | h |
|---|---|---|---|---|---|---|---|---|---|---|---|---|---|---|---|---|---|---|
| Pronunciation position | | | | | | | | | | | | | | | | | | |
| Bilabial | + | − | − | + | − | − | − | − | − | − | − | + | − | − | − | − | + | − |
| Labiodental | − | − | − | − | − | − | + | − | − | + | − | − | − | − | − | − | − | − |
| Dental | − | − | − | − | − | − | − | − | − | − | − | − | − | − | − | − | − | − |
| Alveolus | − | − | + | − | + | − | − | + | − | − | + | − | + | − | + | − | − | − |
| Palatal | − | − | − | − | − | − | − | − | + | − | − | − | − | − | − | + | − | − |
| Soft palate | − | + | − | − | − | + | − | − | − | − | − | − | − | + | − | − | − | − |
| Laryngeal | − | − | − | − | − | − | − | − | − | − | − | − | − | − | − | − | − | + |
| Pronunciation method | | | | | | | | | | | | | | | | | | |
| liquids | − | − | − | − | − | − | − | − | − | − | − | − | − | − | + | + | + | − |
| Affricatuves | − | − | − | − | − | − | − | − | − | − | − | + | + | + | − | − | − | − |
| Plosive | + | + | + | + | + | + | − | − | − | − | − | − | − | − | − | − | − | − |
| Fricatives | − | − | − | − | − | − | + | + | + | + | + | − | − | − | − | − | − | + |
| Sonant | − | − | − | + | + | + | − | − | − | + | + | + | + | + | + | + | + | + |

FIG. 9

METHOD OF CONSTRUCTING MODEL OF RECOGNIZING ENGLISH PRONUNCIATION VARIATION

BACKGROUND OF THE INVENTION

1. Field of Invention

The present invention relates to a method of constructing a model of recognizing English pronunciations, and more particularly to a method of constructing a model of recognizing English pronunciation variations.

2. Related Art

The first language of each country is a kind of common language among all ethnic groups, which is the one selected from the languages of the ethnic groups or regions in this country, so as to facilitate communication among the ethnic groups in this country. It is also feasible among countries.

Currently, English is the popular universal language, and in order to enable the public to know its pronunciations, the corresponding phonetic alphabets are used, such as KK phonetic alphabet (created by John Samuel Kenyon and Thomas A. Knott in the United States), DJ phonetic alphabet (created by Daniel Jones in U.K.), or the International Phonetic Alphabet (IPA) which are popular all over the world. However, living products are gradually computerized currently, and a voice recognition model is usually adopted to activate a product. Therefore, people pay more attention to the voice recognition technology.

In order to achieve the voice recognition technology, pronunciations of the spoken English expressions (sentences, phrases, words, and letters) by using the IPA are recorded and then collected, and finally compiled into a corpus. A pronunciation lexicon, such as a CMU pronunciation lexicon compiled by the Carnegie Mellon University (CMU) and containing about 120,000 expressions, records English expressions and the corresponding IPAs, in which each phonetic alphabet corresponds to a sound characteristic value.

When any English voice recognition system utilizes the CMU pronunciation lexicon, the system converts the pronunciation of an English expression into a corresponding sound characteristic value, and compares this sound characteristic value with the sound characteristic value recorded in the CMU pronunciation lexicon, so as to obtain the corresponding English expression.

However, the prior art has the unavoidable defects.

Firstly, when the native language of a speaker is not English, i.e., the speaker is not from a British/American English speaking country, his/her English pronunciations are mostly influenced by intonations or pronunciation habits of the native language. For example, FIGS. 1A to 1C show incorrect English pronunciations of Taiwanese under the influence of mandarin, i.e., the pronunciation variations cannot be found in the IPAs. However, the current voice recognition system usually adopts the pronunciation lexicon formed of standard American/British English samples. Therefore, if the parsed sound characteristic value cannot be found in the pronunciation lexicon, the correct English expressions cannot be parsed correctly.

Secondary, the conventional voice recognition technology predefines all possible pronunciations (including true pronunciations and assumptive pronunciations), and only the pronunciation variations appearing in the corpus are defined in the pronunciation lexicon, for example, for the English letter A, the phonetic alphabet thereof and the sound characteristic values of the possible pronunciation variations are collected. The pronunciations not included in the corpus and pronunciations in a non-English speaking region such as fifty Japanese phonetic alphabets, thirty-seven Chinese phonetic alphabets will not be defined, so the range of the pronunciations that can be parsed is too narrow.

SUMMARY OF THE INVENTION

In view of the above, the present invention is directed to provide a method of constructing a pronunciation variation model according to the native language of a region and the English phonetic alphabets, which may recognize English pronunciation variations of the public in that region under the influence of the native language.

In order to achieve the aforementioned object, the present invention provides a method of constructing a model of recognizing English pronunciation variations, which is applying to a computer connected to a non-transitory recording medium and used for recognizing English pronunciations with intonations caused by different non-English native languages. The construction method includes firstly providing a plurality English expressions and corresponding phonetic alphabets by the non-transitory recording medium, and collecting a plurality of sound information corresponding to the English expressions by the computer; corresponding the phonetic alphabets of the non-English native language and English of a region to a plurality of International Phonetic Alphabets (IPAs) by the computer, so as to form a plurality of pronunciation models, wherein the computer forms each pronunciation models, the computer collects a plurality of phonetic alphabet pronunciations directed to one of the IPAs, and converts each of the phonetic alphabet pronunciations into a corresponding characteristic value, and forms the characteristic values into a value group and calculates a grouping threshold value corresponding to the characteristic values, then, the computer calculates a mean value of the value group and obtains a first characteristic value from the value group which is away from the mean value by a maximum numerical distance, and calculates a second characteristic value in the value group which is away from the first characteristic value by a maximum numerical distance, so as to calculates numerical distances between each characteristic value and the first characteristic value and between each characteristic value and the second characteristic value, and forms two value groups, one of the two value groups containing the characteristic values close to the first characteristic value and the other one of the two value groups containing the characteristic values close to the second characteristic value, respectively, the computer obtains a within-group distance and a between-group distance of the two value groups, so as to calculate a grouping standard, and determines whether the grouping standard is higher than the grouping threshold value through comparison, if yes, calculating each mean value of the two value group and back to the step of obtaining a first characteristic value from the value group which is away from the mean value by a maximum numerical distance, and calculates a second characteristic value in the value group which is away from the first characteristic value by a maximum numerical distance, and if no, obtaining each value group of the pronunciation model that the computer want to form; converting the sound information of the English expressions by using the pronunciation models by the computer, so as to form a pronunciation variation network of the corresponding English expression, thereby detecting whether the English expressions have pronunciation variation paths; and finally summarizing the pronunciation variation paths to form a plurality of pronunciation variation rules and storing the rules to form a pronunciation variation model by the computer. The rules are stored in the non-transitory recording medium or in the computer.

The method provided by the present invention may also assume in a form of a non-transitory recording medium, and may be executed by reading a computer program stored in the recording medium, thereby solving the same problem through the same method and achieving the same efficacies.

The present invention achieves the efficacies that the prior art cannot achieve, and constructs a pronunciation variation model for each region, so as to enable the current English recognition system to recognize English pronunciations of the public in a region with intonations caused by a different native language through the pronunciation variation model. Or, when researchers in each region intend to construct an exclusive English recognition system for this region, they may construct such a system according to the method of constructing the pronunciation variation model. No matter whether the pronunciation variation model is created in the former or latter English recognition system, the accuracy of recognizing voice may be enhanced, thereby enhancing the applicability of the English recognition system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein:

FIGS. 1A to 1C show corresponding tables of common incorrect pronunciations of phonetic alphabets;

FIG. 3 is a partial schematic view of the CMU pronunciation lexicon according to an embodiment of the present invention;

FIG. 6 is a table of phonetic alphabets of the IPA corresponding to the pronunciation types according to one embodiment of the present invention;

FIG. 7 is a schematic view of a phone confusion matrix according to one embodiment of the present invention;

FIG. 8 is a referencing table of the arrangement of the phonetic alphabets according to one embodiment of the present invention;

FIG. 9 is a reference schematic view of the characterization of the phonetic alphabets of the sounds according to one embodiment of the present invention;

DETAILED DESCRIPTION OF THE INVENTION

In order to make the object, structure, features, and functions of the present invention more comprehensible, preferred embodiments accompanied with figures are described in detail below.

Figure 2:
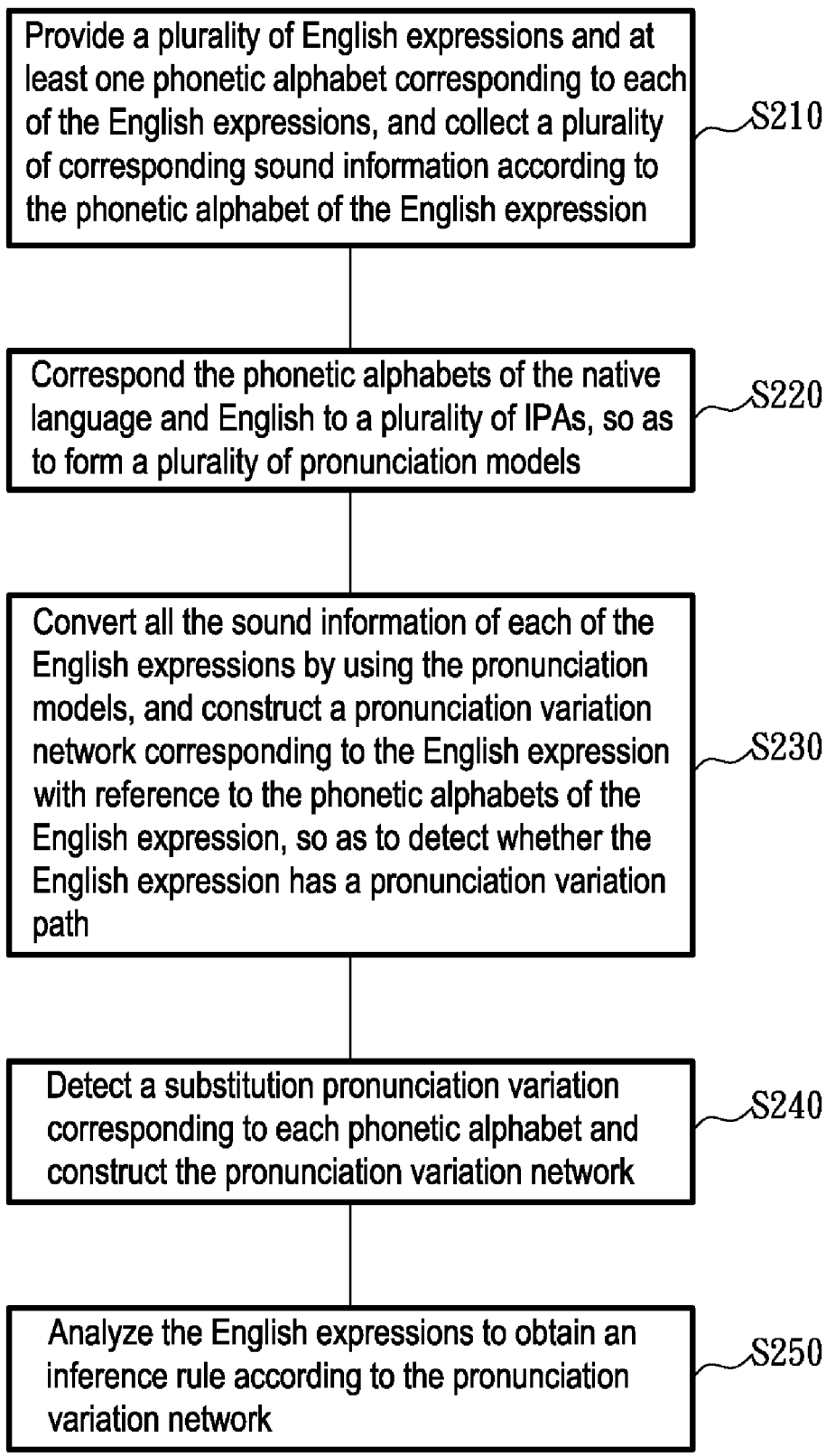
FIG. 2 is a flow chart of processes of constructing a pronunciation variation model according to an embodiment of the present invention.
Figure 4A:
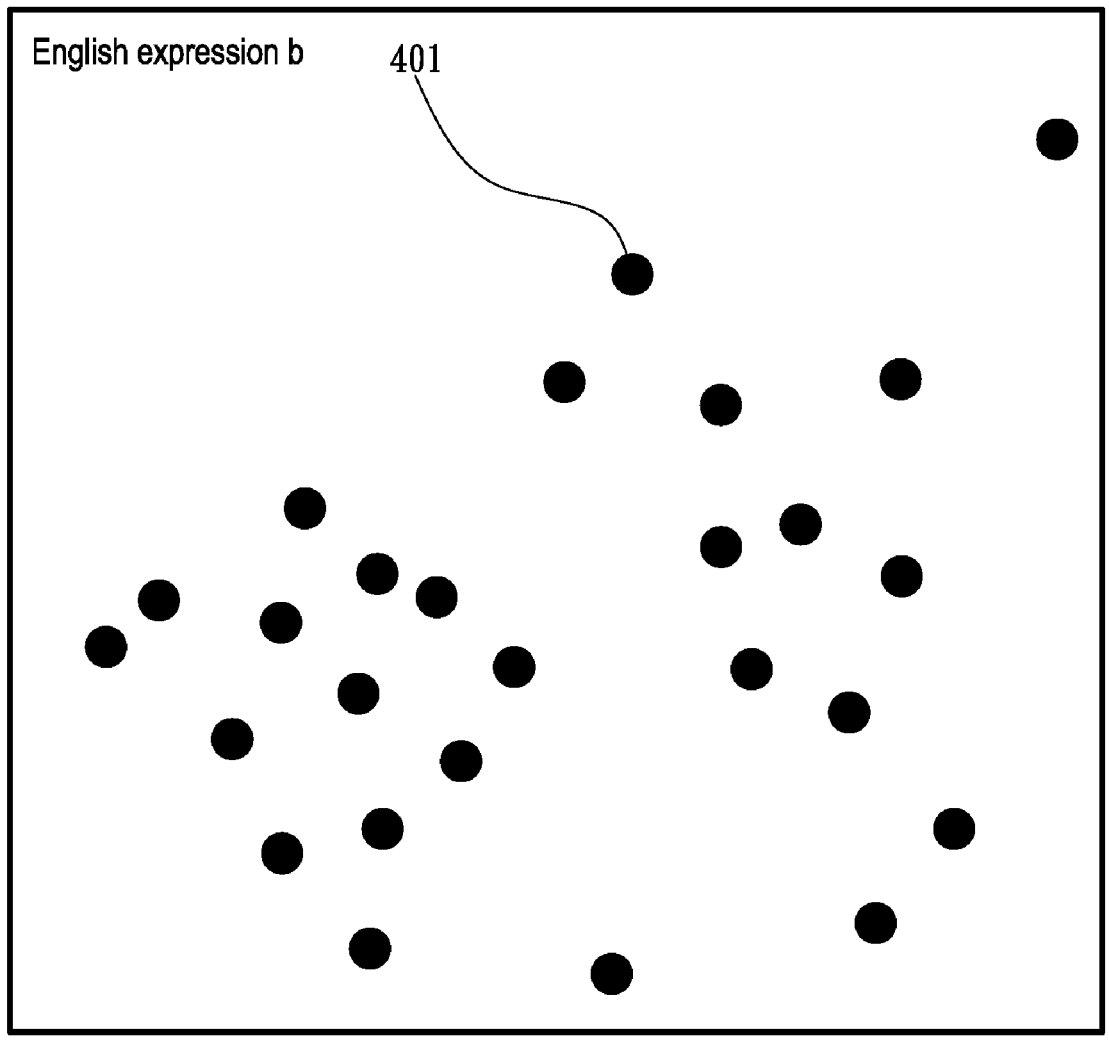
FIGS. 4A to 4F are schematic views of grouping the sound characteristic values of the pronunciation model.
Figure 4B:
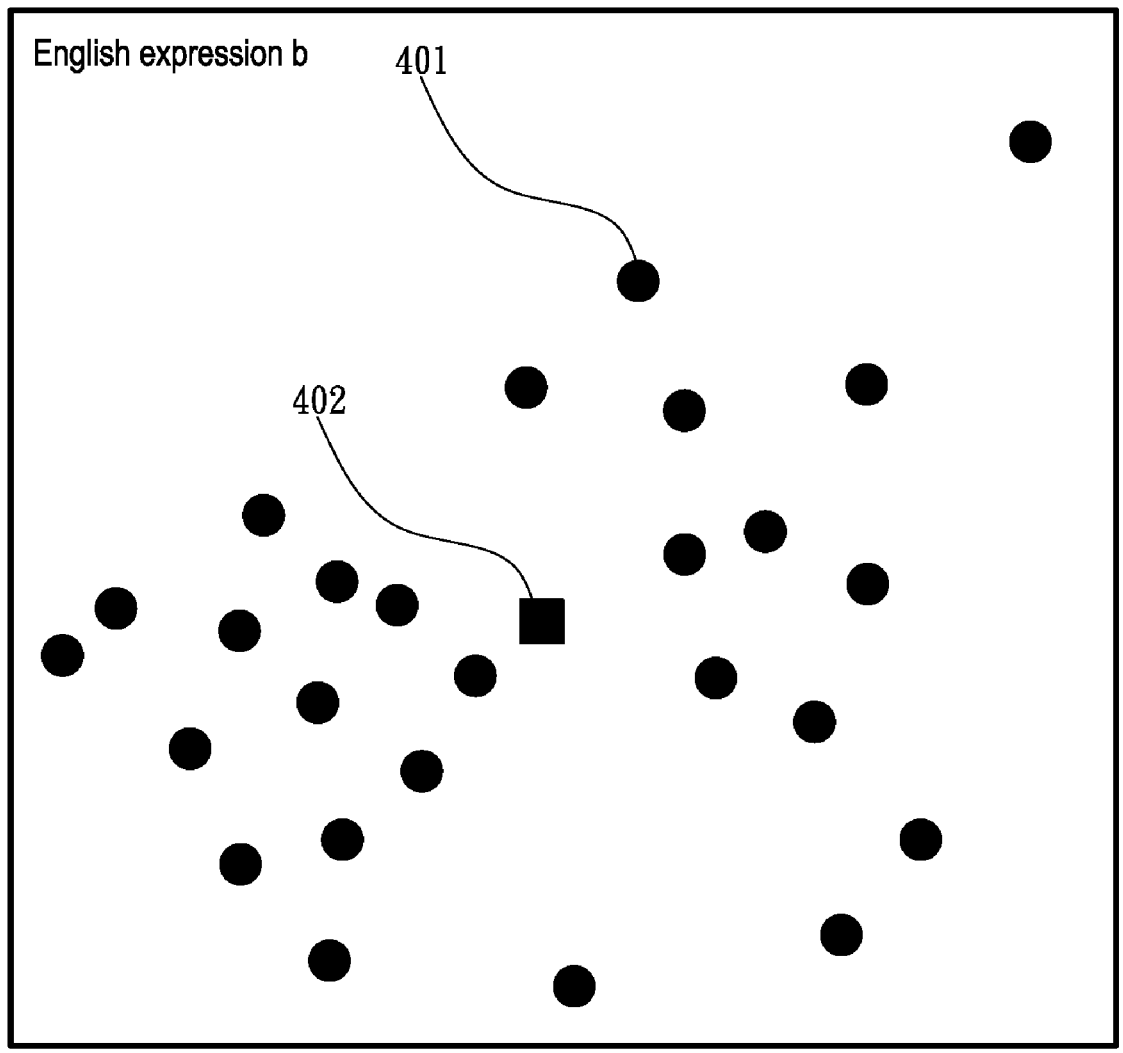
Figure 4C:
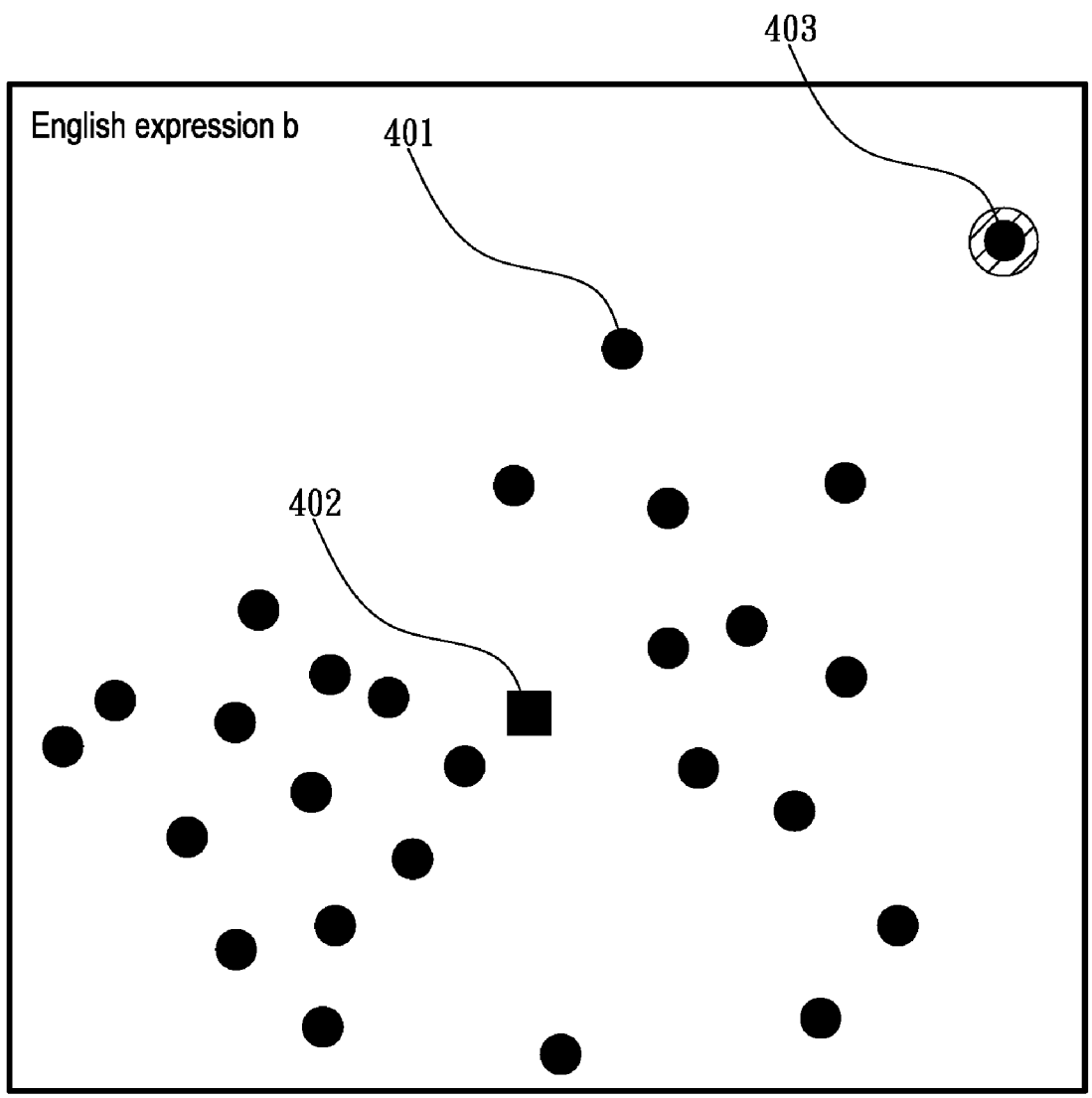
Figure 4D:
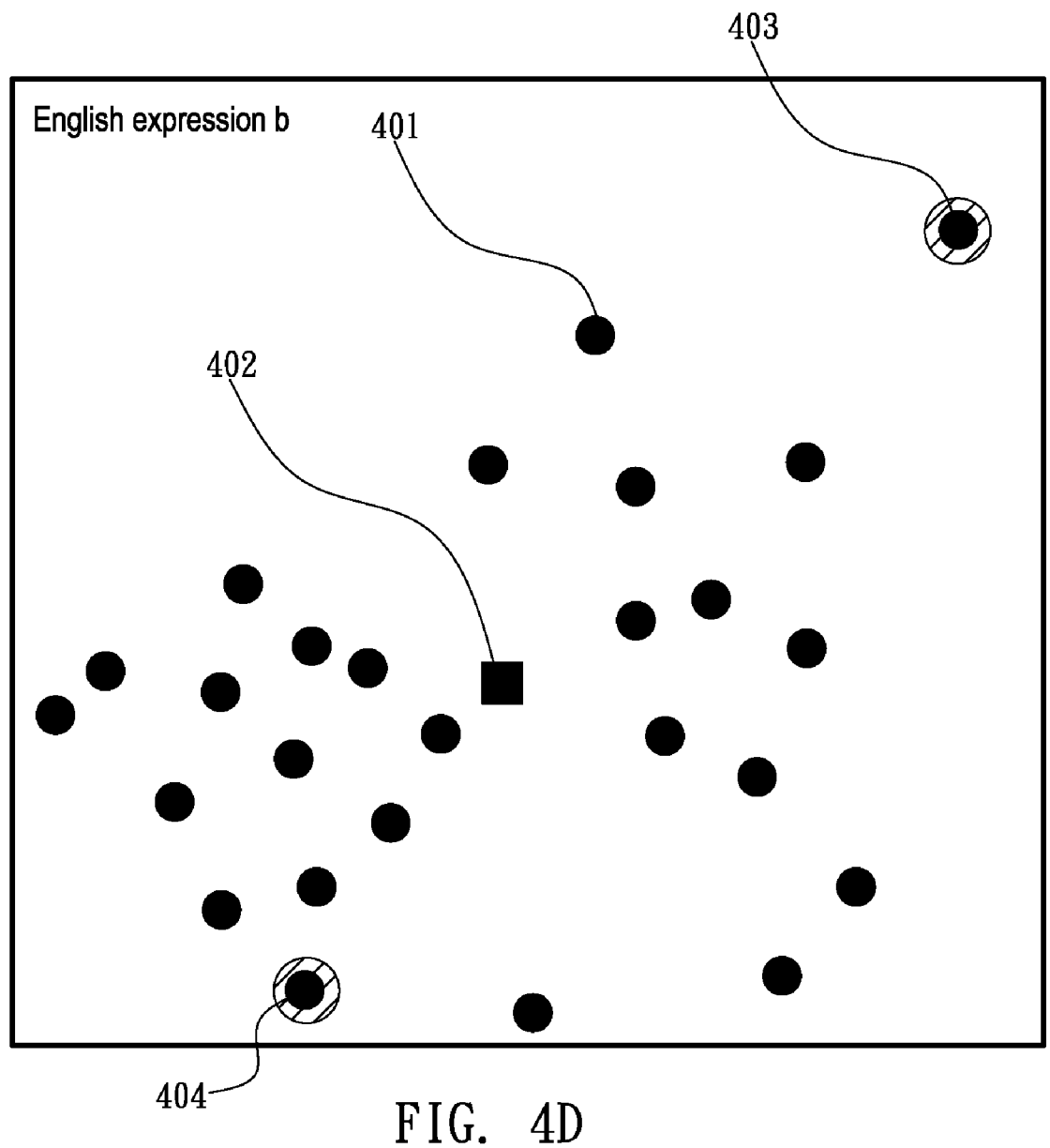
Figure 4E:
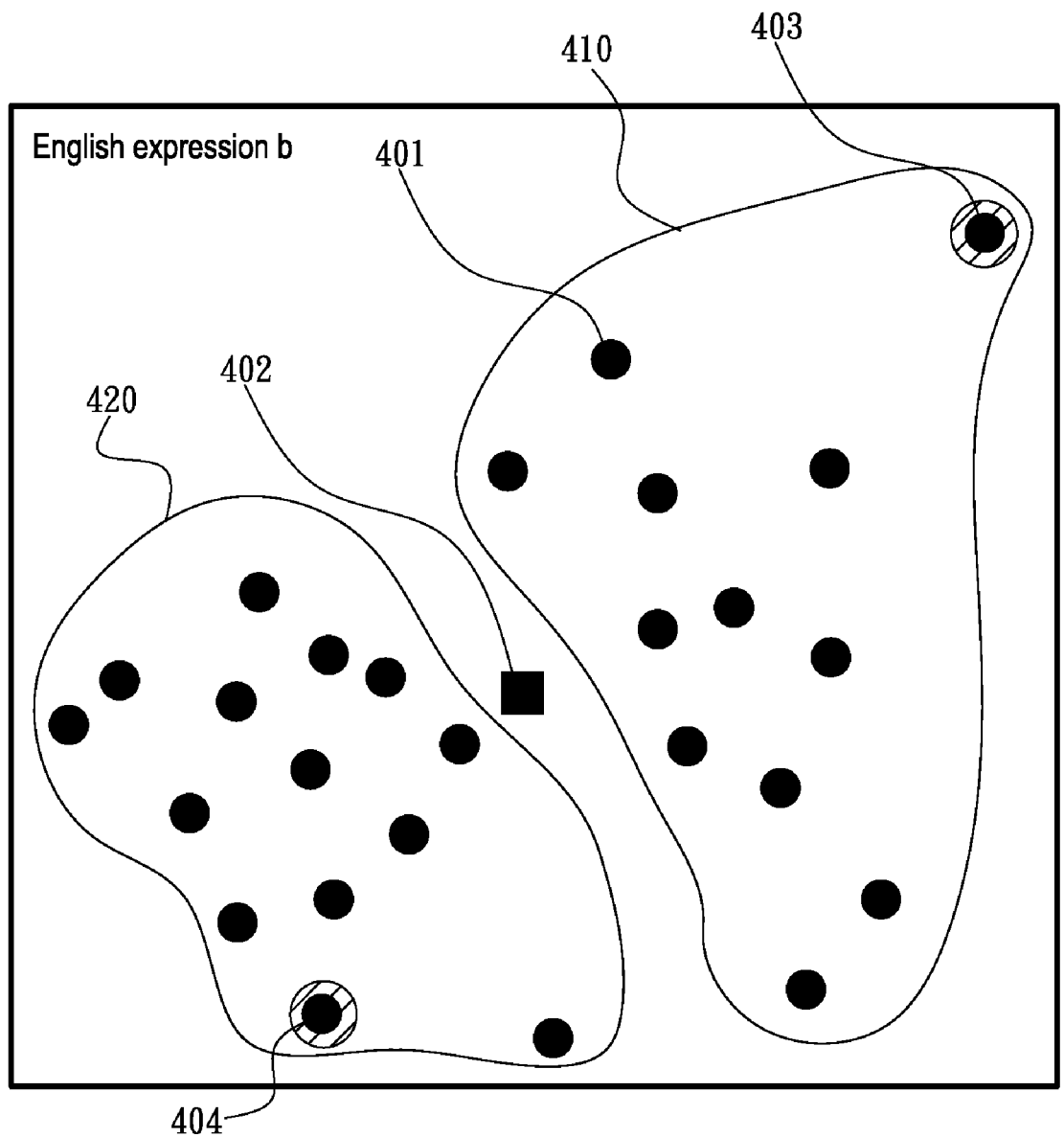
Figure 4F:
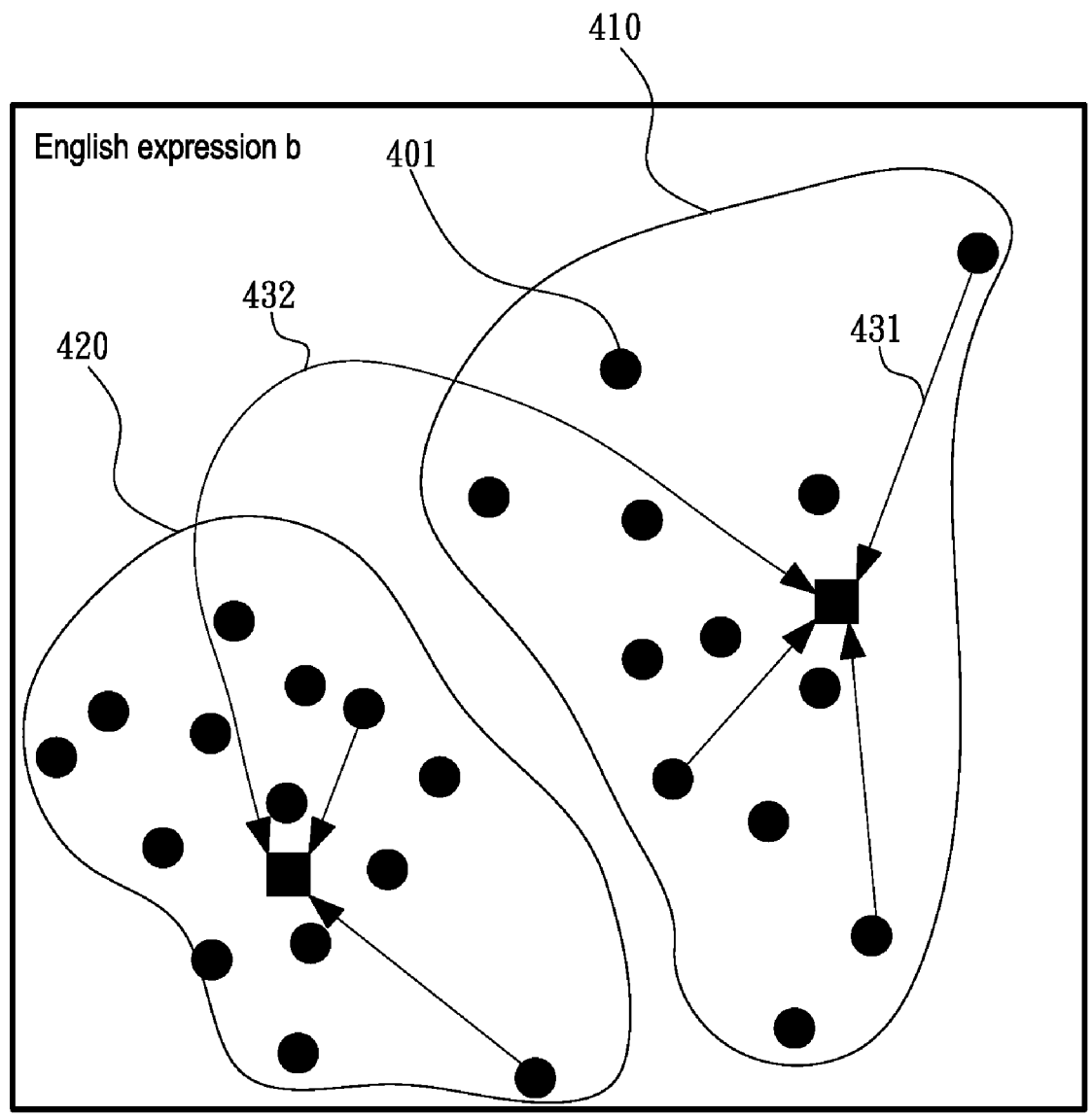

Referring to FIG. 2, a flow chart of processes of constructing a pronunciation variation model according to an embodiment of the present invention is shown. The pronunciation variation model is used to recognize English pronunciations with different intonations influenced by a non-English native language, which is applying to a computer connected to a non-transitory recording medium, and the construction method comprises the following steps.

Provide a plurality of English expressions and at least one phonetic alphabet corresponding to each of the English expressions by the non-transitory recording medium, and collect a plurality of corresponding sound information according to the phonetic alphabet of the English expression by the computer (Step S210). This step is illustrated based on the CMU pronunciation lexicon compiled by the Carnegie Mellon University (CMU).

Referring to FIG. 3, a schematic partial view of the CMU pronunciation lexicon according to an embodiment of the present invention is shown. Each of the English expressions in the pronunciation lexicon has its correct phonetic alphabet, and is arranged in the order of sorting number, English expression, and phonetic alphabet.

The phonetic alphabets in this embodiment are based on the IPA, and the collected sound information is provided by the public in the same region, ethnic group or country in which the native language is not English. In the following, the English pronunciations of Taiwanese are taken as the samples of the sound information.

Correspond the phonetic alphabets of the non-English native language and English to a plurality of IPAs, so as to form a plurality of pronunciation models by the computer (Step S220). For example, thirty-seven pronunciations of the Chinese phonetic symbols in Taiwan and thirty-nine pronunciations of the English phonetic alphabets are correspondingly formed into fifty-five IPAs.

Collect a plurality of phonetic alphabet pronunciations directed to one of the IPAs, and convert each of the phonetic alphabet pronunciations into a corresponding characteristic value. As shown in FIGS. 4A to 4F, for example, as for the English expression b, firstly collect a plurality of Taiwanese's pronunciations of the phonetic alphabet pronunciations of b and transform the phonetic alphabet pronunciations of English expression b into relevant characteristic values 401 by using a Fourier Transform equation. Then, form the characteristic values 401 into a value group 410 and calculate a grouping threshold value corresponding to the characteristic values 401. The grouping threshold value is not an absolute threshold, but an optimal corresponding value calculated by using a statistical method according to the quantity of characteristic values 401.

Then, calculate a mean value 402 of the value group 410, in which all characteristic values 401 are summarized firstly, thereby getting the mean value 402. Next, calculate numerical distances between the mean value 402 and each of the characteristic values 401, so as to obtain a first characteristic value 403 from the value group 410 which is away from the mean value 402 by a maximum numerical distance. Afterwards, calculate a second characteristic value 404 in the same value group 410 which is away from the first characteristic value 403 by a maximum numerical distance.

Then, calculate the numerical distances between each of the characteristic values 401 and the first characteristic value 403 and between each of the characteristic values 401 and the second characteristic value 404, and adopt a small result from the calculation results to determine whether each of the characteristic values 401 corresponds to the first characteristic value 403 or the second characteristic value 404, thereby forming a value group 410 containing the characteristic values 401 close to the first characteristic value 403 and a value group 420 containing the characteristic values 401 close to the second characteristic value 404, respectively. Subsequently, obtain a within-group distance 431 and a between-group distance 432 of the two value groups, thereby calculating a grouping standard.

The so-called between-group distance 432 refers to a distance between any value group and other value groups, and is a distance between the mean values of each value group. The within-group distance 431 refers to the summation of the distances between each of the characteristic values 401 and the mean value 402 in the same group. The grouping standard is that the between-group distance 432 divided by the within-group distance 431.

Determine whether the grouping standard is higher than the grouping threshold value through comparison, if no, obtain the value group in the pronunciation model, and if yes, continue to calculate a mean value 402 of each value group, so as to perform grouping operation, till the grouping standard is lower than the grouping threshold value. Thereby, at least one value group of the pronunciation model of the corresponding b may be obtained. The characteristic values in the value group correspond to the phonetic alphabets of the non-English native language, i.e., correspond to the characteristic values of the phonetic symbols. Or, the value group of the characteristic values of the corresponding English phonetic alphabets is obtained. In a similar way, the pronunciation models generated by all of the phonetic symbols and the English phonetic alphabets corresponding to the IPAs may be constructed.

Convert all the sound information of each of the English expressions by using the pronunciation models, and construct a pronunciation variation network corresponding to the English expression with reference to the phonetic alphabets of the English expression by the computer, so as to detect whether the English expression has a pronunciation variation path (Step S230).

Figure 5:
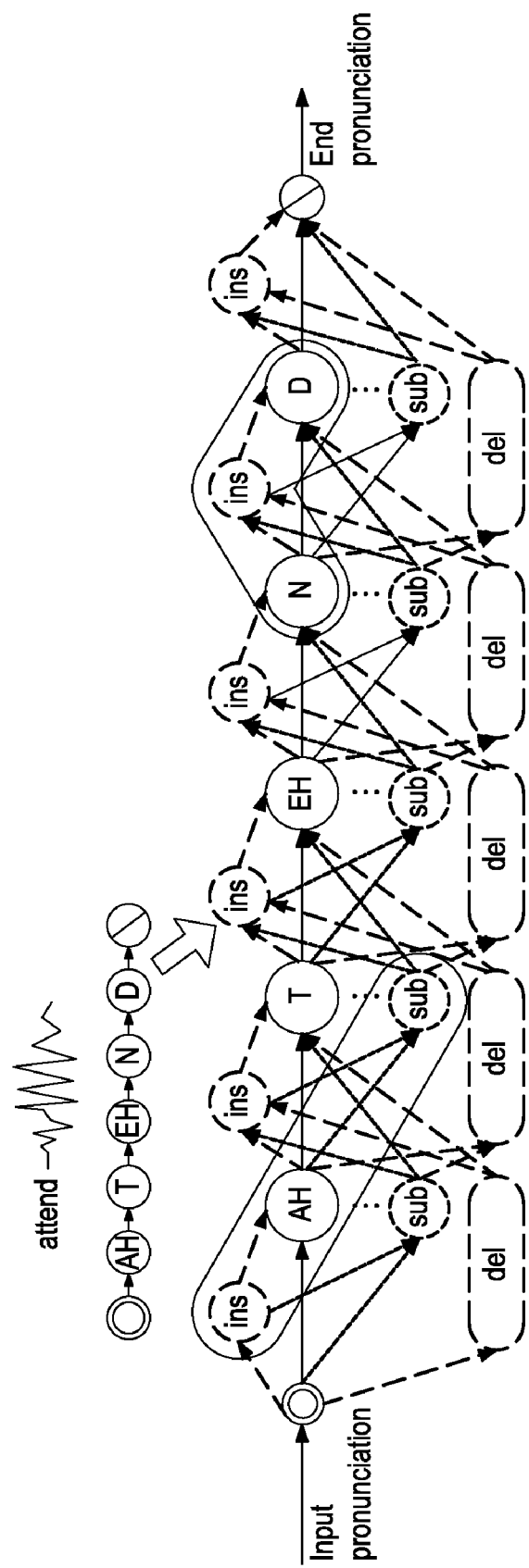
FIG. 5 is a creation view of the pronunciation variation network according to one embodiment of the present invention.

As shown in FIG. 5, for example, the corresponding phonetic alphabets of the English expression "attend" are "AH, T, EH, N, D" of IPA in the CMU pronunciation lexicon in sequence, and the phonetic alphabets of the English expression are set as a reference, so as to detect whether an insertion pronunciation variation exists in each pronunciation of the phonetic alphabets of English, i.e., detect whether an insertion pronunciation variation exists in the pronunciation between the input of the pronunciation and "AH," "AH" and "T," "T" and "EH," "EH" and "N," "N" and "D," "D" and the end of pronunciation by using the constructed pronunciation models.

Next, detect whether a deletion pronunciation variation exists between each of the phonetic alphabet and its next phonetic alphabet. However, during the detection process, not only whether the deletion pronunciation variation exists between the two adjacent phonetic alphabets is detected, but also whether a deletion pronunciation variation exists between a phonetic alphabet and a following insertion pronunciation variation if the phonetic alphabet is followed by an insertion pronunciation variation.

Finally, detect a substitution pronunciation variation corresponding to each phonetic alphabet and construct the pronunciation variation network by the computer (Step S240). However, in order to reduce the complexity of the pronunciation variation network, the following two methods may be used to remove impossible pronunciation variation paths.

The first method is to obtain a pronunciation type of each of the phonetic alphabets in the IPA, and use at least one IPA of the same pronunciation type as a substitution of the phonetic alphabet. As shown in FIG. 6, it is a table of phonetic alphabets of the IPA corresponding to the pronunciation types, and the table is divided into "Voiced plosive," "Unvoiced plosive," "Fricatives," "Affricatives," "Nasals," "Liquids," "Front vowels," "Central vowels," "Back rounded vowels," and "Back unrounded vowels."

Compare the phonetic alphabets "AH, T, EH, N, D" of the word "attend" with the table to obtain the IPAs of the same pronunciation type. For example, as for the phonetic alphabet "T," the pronunciation type is "Unvoiced plosive," and only the phonetic alphabets "P" and "K" have the same pronunciation type. Therefore, the substitution pronunciation variation of the phonetic alphabet "T" merely includes "P" and "K" and it is impossible for the "T" to be replaced by other phonetic alphabets with different pronunciation types, for example, it is impossible to pronounce the phonetic alphabet "T" as "A" by mistake. Therefore, the phonetic alphabets with different pronunciation types will not be taken into account.

The second method is to establish a phone confusion matrix, as shown in FIG. 7. That is, firstly collect all the pronunciations of the IPAs, and calculate the pronunciation probability for each IPA to be pronounced as other IPAs by mistake, so as to establish the phone confusion matrix. Then, based on the phonetic alphabets of the English expressions, take at least one IPA in a pronunciation probability range, and set the selected IPA as the substitution pronunciation variation of the phonetic alphabet. The pronunciation probability corresponding to English expression in the phone confusion matrix is as follows, (A)=0%-10%, (B)=10%-15%, (C)=15%-20%, (D)=20%-25%, (E)=25%-30%, (F)=30%-35%, (G)=35%-40%, (H)=40%-45%, (I)=45%-50%, (J)=50%-55%, (K)=55%-60%, (L)=60%-65%, (M)=65%-70%, (N)=70%-75%, (O)=75%-80%, (P)=80%-85%, (Q)=85%-90%, (R)=90%-95%, (S)=95%-100%, (T)=100%.

However, in order to obtain a substitution pronunciation variation accurately while reducing the complexity of the pronunciation variation network, if the pronunciation probability is too high, for example, 100% (T), the pronunciation must be incorrect; and if the pronunciation probability is too low, for example, 0%-10%(A), it is mostly impossible to be pronounced by mistake. Therefore, the aforementioned two circumstances will not be considered to be the substitution pronunciation variation of the phonetic alphabets.

For example, as for the phonetic alphabet "EH" of the English expression "attend," compare it with the phone confusion matrix, the pronunciation probability of pronouncing "EH" correctly is 55%-60% (K), the pronunciation probability of pronouncing it as "er M" is 10%-15% (B), the pronunciation probability of pronouncing it as "AE" is 15%-20% (C), and the pronunciation probability of pronouncing it as other phonetic alphabets is 0%-5% (A). Therefore, only the phonetic alphabets "er_M" and "AE" server as the substitution pronunciation variations of the phonetic alphabets "EH," and others will not be taken into account, thereby reducing the complexity of the pronunciation variation network of the English expression "attend" and enhancing the recognition accuracy of the pronunciation variation network.

However, all the pronunciation variations (including insertion pronunciation variations, deletion pronunciation variations, and substitution pronunciation variations) are inferred by three continuous pronunciations, which should all be possible pronunciations. As shown in FIG. 8, for example, the phonetic alphabets of each of the expressions in the CMU pronunciation lexicon are arranged by using three continuous phonetic alphabets as a set, so as to count the times for arranging each set of phonetic alphabets in the CMU pronunciation lexicon and calculate the probability. In this manner, more than 20,000 sets of phonetic alphabets may be obtained from the CMU pronunciation lexicon, and each set of phonetic alphabets is provided with corresponding statistic times and probability, i.e., represents the circumstance of most possibly forming the insertion pronunciation variations, and the more than 20,000 sets of phonetic alphabets are arranged into a reference table of arranging the phonetic alphabets.

For example, the phonetic alphabets of the English expression "attend" are "AH, T, EH, N, D," and the times and probability of the arrangement by using the phonetic alphabets "AH, T, EH," and "T, EH, N," and "EH, N, D" may be found from the CMU pronunciation lexicon. In a similar way, summarize all the arrangements of the phonetic alphabets in the CMU pronunciation lexicon and the statistic probability and times.

The reference table of the arrangement of the phonetic alphabets in the statistical result is shown in FIG. 8, which shows a part of the reference table. The arrangement of the phonetic alphabets "t_M-i_M-sil" numbered with 26 (the "sil" in the whole text and drawings are not pronounced) has the statistic probability of 5974 times, while the arrangement of the phonetic alphabets "n_M-t M-i_M" numbered with 25 has the statistic probability of 2012 times. That is, the arrangement of the phonetic alphabets "t_M-i_M-sil" numbered with 26 may be possibly read in the 120,000 English expressions in the CMU pronunciation lexicon, or the insertion pronunciation variations are formed, while it is less possible to read the arrangement of the phonetic alphabets "n_M-t_M-i_M" numbered with 25.

When people not from British/American English speaking countries, such as Taiwanese, recognize the English expressions they are speaking, the reference table may be used to infer the possibility of pronouncing the English expressions in the Taiwanese' habits, i.e., obtain the relatively accurate pronunciation variation network with a low complexity.

Furthermore, in order to obtain the pronunciation variation rules besides the normal pronunciation variations, the English expressions may be analyzed to obtain an inference rule according to the pronunciation variation network (Step S250). Firstly, correspond all the phonetic alphabets to the pronunciation characteristics of the linguistics, then, analyze the pronunciation variation network of the English expression to obtain a corresponding inference rule, and determine whether the phonetic alphabets having the same pronunciation characteristic have the same inference rule.

As shown in FIG. 9, it is a schematic view of corresponding the phonetic alphabets to the pronunciation characteristics of the linguistics in the present invention.

Figure 10:
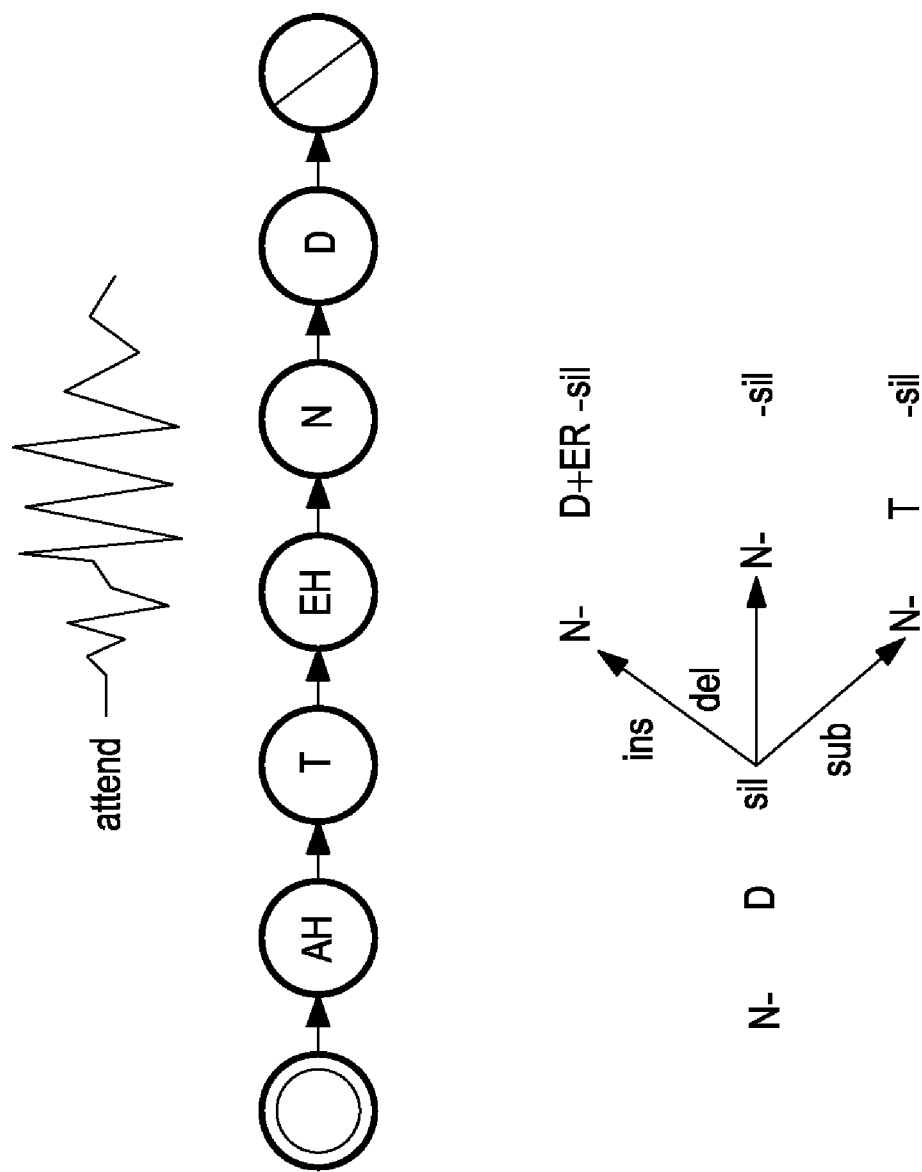
FIG. 10 is a schematic view of pronunciation variations according to one embodiment of the present invention.

As shown in FIG. 10, as for the phonetic alphabets "AH, T, EH, N, D" in "attend," the path is "start-AH-T-EH-N-D-sil." Firstly, find the pronunciation variation network of "attend," and use a data mining method to find all pronunciation variations of "attend" in the pronunciation variation network. In this example, "N-D-sil" has three pronunciation variations.

Firstly, the accent of the pronunciation is strong, pronounce "N-D-sil" as "N-D-ER-sil" or "N-D-AH-sil," i.e., form the circumstance of the insertion pronunciation variation.

Secondary, the pronunciation is partially omitted, pronounce "N-D-sil" as "N-sil," i.e., form the circumstance of the deletion pronunciation variations.

Thirdly, the pronunciation is incorrect, pronounce "N-D-sil" as "N-T-sil," i.e., form the circumstance of the substitution pronunciation variation.

As such, when there is phonetic alphabet "N" before the phonetic alphabets "D," and "sil" following it, three vocalization variations corresponding to the three pronunciation variation rules exist.

Figure 11:
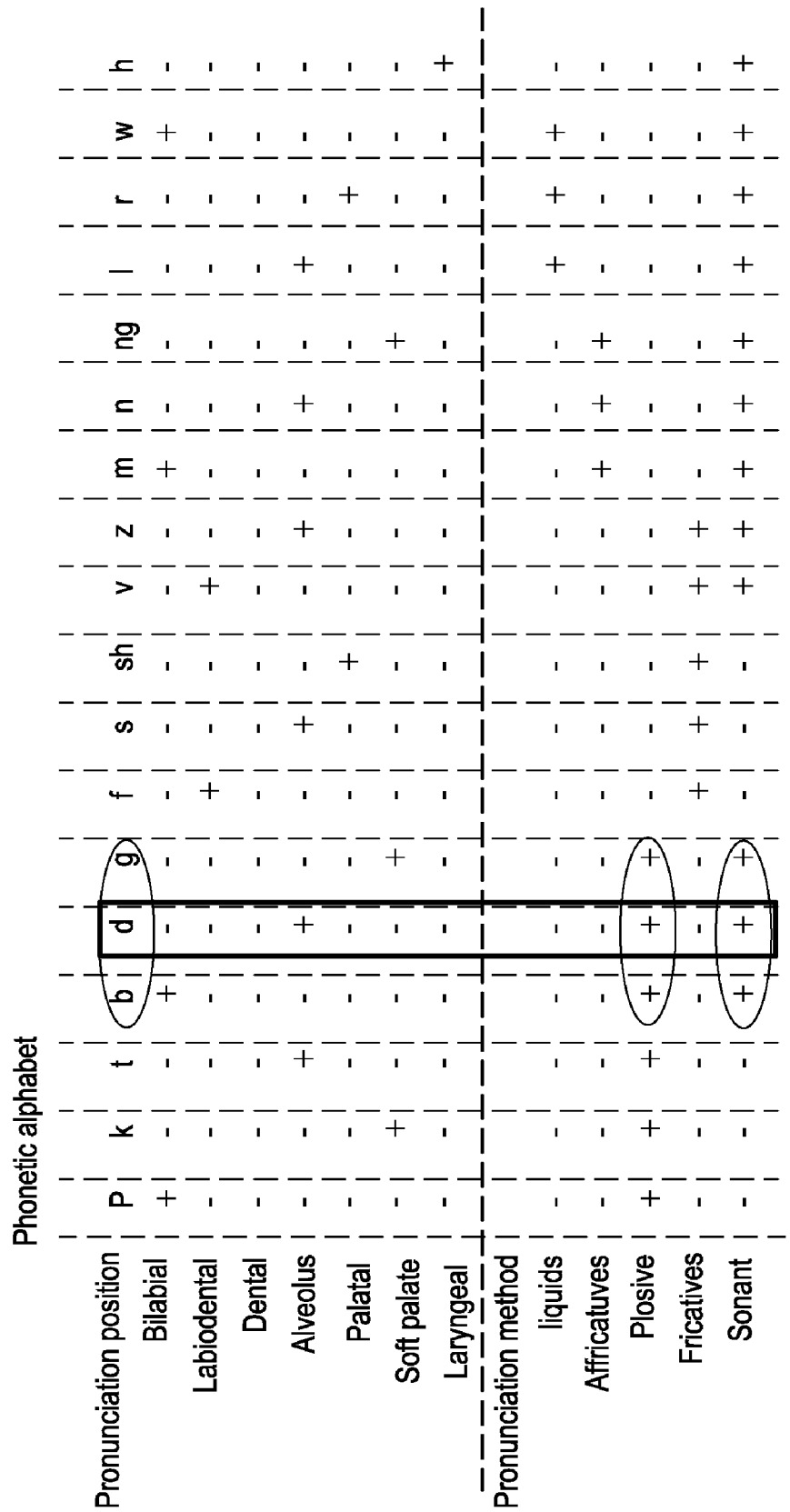
FIG. 11 is a reference schematic view of the characteristics of the sounds according to one embodiment of the present invention.

Compare the phonetic alphabets "D" with the schematic view of the pronunciation characteristics of the linguistics in FIG. 9, thereby leading to the result in FIG. 11, i.e., the phonetic alphabet "D," the phonetic alphabets "B," and the phonetic alphabet "G" are alveolar, bilabial, and velar respectively in aspect of pronunciation positions, the pronunciation methods are all plosive and sonant. Therefore, it is determined that the pronunciation variation rule of "N-D-sil" is applicable to the phonetic alphabet "B" and the phonetic alphabet "G," i.e., uncollected pronunciation variation rules may be inferred.

Then, the data mining method is used to calculate confidence scores of each of the pronunciation variation rules to obtain the relative weight relation of each of the pronunciation variation rules and determine a precedence sequence of the pronunciation variation rules of each of the English expressions, thereby obtaining a most accurate pronunciation variation path.

Figure 12:
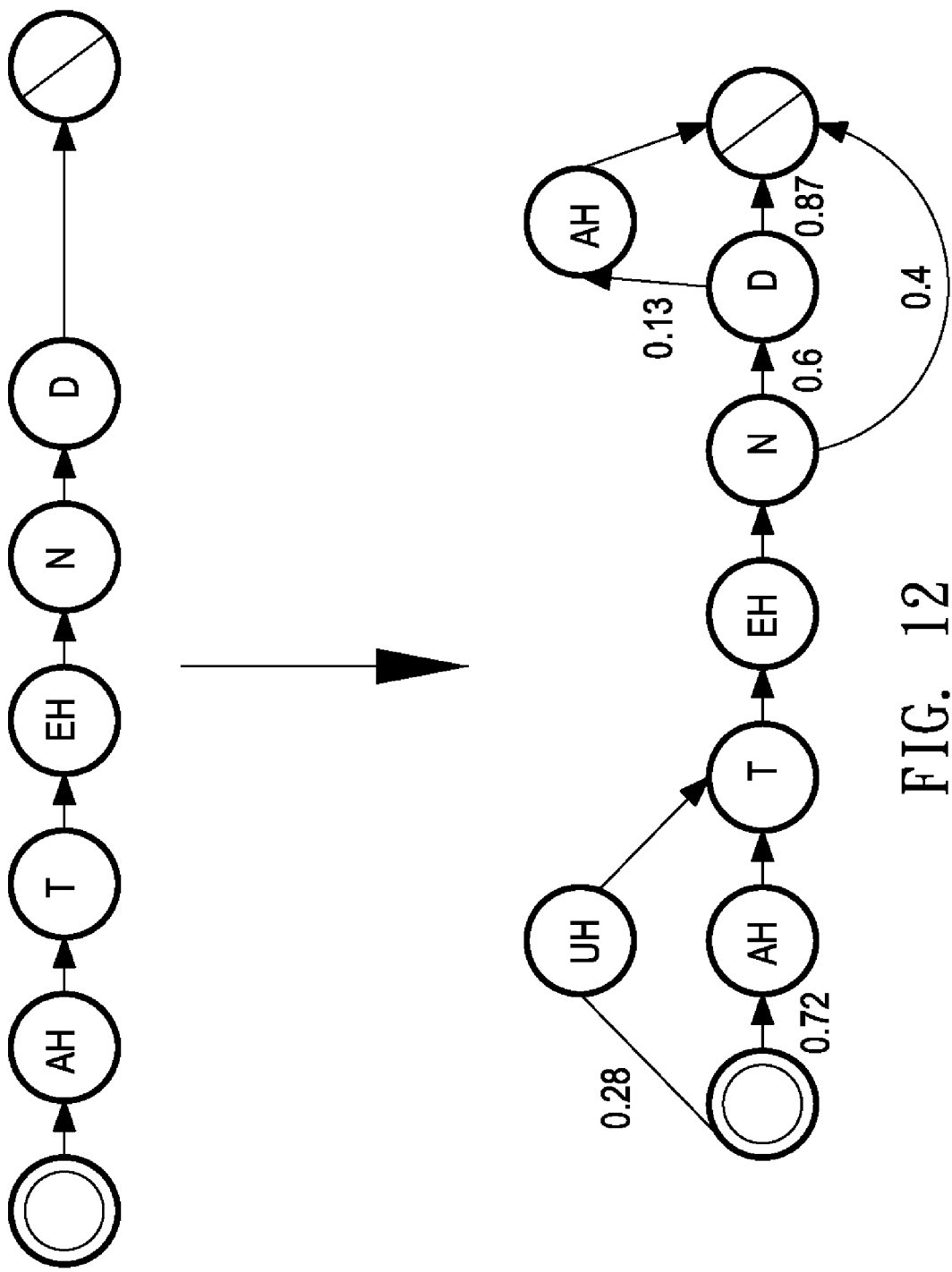
FIG. 12 is a schematic view of the path of pronunciation variations according to one embodiment of the present invention.

As shown in FIG. 12, the pronunciation variation path "attend" is shown. The aforementioned method is used to form the pronunciation variation network of "attend," and then the found or inferred pronunciation variation rules are used to obtain the most simple pronunciation variation path. From the figure, it can be known that phonetic alphabet "AH" has the probability of 72% to be pronounced correctly and the probability of 28% to be pronounced as "UH" by mistake. The probability of pronouncing "D" after the phonetic alphabet "N" is 60%, and the probability of not pronouncing "sil" is 40%. The probability of not pronouncing "sil" after the phonetic alphabets "D" is 87%, and the probability of producing mixture to pronounce "AH" is 13%. The pronunciation variation path of "attend" is the optimal variation path generated after the pronunciation variation network of "attend" is simplified as far as possible by using the pronunciation variation rules.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of constructing a model of recognizing English pronunciation variations, applying to a computer connected to a non-transitory recording medium, for recognizing English pronunciations with intonations influenced by different non-English native languages, the method at least comprising:

1) providing a plurality of English expressions and at least one phonetic alphabet corresponding to each of the English expressions by the non-transitory recording medium, and collecting a plurality of corresponding sound information according to the phonetic alphabet of each of the English expression by the computer;

2) corresponding phonetic alphabets of the non-English native language and English to a plurality of international phonetic alphabets (IPAs) by the computer, so as to form a plurality of pronunciation models, wherein the computer forms each pronunciation models;

2-1) collecting a plurality of phonetic alphabet pronunciations directed to one of the IPAs, and converts each of the phonetic alphabet pronunciations into a corresponding characteristic value;

2-2) forming the characteristic values into a value group and calculates a grouping threshold value corresponding to the characteristic values;

2-3) calculating the computer calculates a mean value of the value group;

2-4) obtaining a first characteristic value from the value group which is away from the mean value by a maximum numerical distance;

2-5) calculating a second characteristic value in the value group which is away from the first characteristic value by a maximum numerical distance;

2-6) calculating numerical distances, wherein a first distance is calculated between each characteristic value and the first characteristic value and a second distance is calculated between each characteristic value and the second characteristic value, and forming value groups by the first distances and the second distances, one of the two value groups containing the characteristic values close to the first characteristic value and the other one of the two value groups containing the characteristic values close to the second characteristic value, respectively;

2-7) obtaining a within-group distance and a between-group distance of the two value groups, so as to calculate a grouping standard; and 2-8) determining whether the grouping standard is higher than the grouping threshold value through comparison, if yes, calculating each mean value of the two value groups and then, the step 2-4) to the step 2-8) are repeated for each one of the two value groups respectively, and if no, obtaining each value group of the pronunciation model that the computer want to form;

3) converting the sound information of each of the English expressions by using the pronunciation models, and constructing a pronunciation variation network corresponding to the English expression with reference to the phonetic alphabet of the English expression by the computer, so as to detect whether each of the English expressions has a pronunciation variation path; and 4) summarizing each of the pronunciation variation paths to form a plurality of pronunciation variation rules by the computer.

2. The method of constructing a model of recognizing English pronunciation variations as claimed in claim 1, wherein the characteristic values of at least one value group of the pronunciation model correspond to the phonetic alphabets of the non-English native language.

3. The method of constructing a model of recognizing English pronunciation variations as claimed in claim 1, wherein the characteristic values of at least one value group of the pronunciation model correspond to the phonetic alphabets of the English.

4. The method of constructing a model of recognizing English pronunciation variations as claimed in claim 1, wherein the phonetic alphabet pronunciation is transformed into the characteristic value by using Fourier Transform equation.

5. The method of constructing a model of recognizing English pronunciation variations as claimed in claim 1, wherein the step of constructing a pronunciation variation network corresponding to the English expression comprises:
setting the phonetic alphabet of the English expression as a reference;
detecting whether an insertion pronunciation variation exists in each pronunciation of the phonetic alphabets of English;
detecting whether a deletion pronunciation variation exists between each phonetic alphabet and its next phonetic alphabet;
detecting a substitution pronunciation variation corresponding to each phonetic alphabet; and
constructing the pronunciation variation network.

6. The method of constructing a model of recognizing English pronunciation variations as claimed in claim 5, wherein the step of detecting a substitution pronunciation variation corresponding to each phonetic alphabet comprises:
obtaining a pronunciation type in the IPA for each phonetic alphabet; and
using at least one IPA with the same pronunciation type as the substitution pronunciation variation of the phonetic alphabet.

7. The method of constructing a model of recognizing English pronunciation variations as claimed in claim 5, wherein the step of detecting a substitution pronunciation variation corresponding to each phonetic alphabet comprises:
collecting pronunciations of the IPA;
calculating pronunciation probability for each IPA, so as to establish a phone confusion matrix;
obtaining at least one IPA in a pronunciation probability range based on the phonetic alphabet; and
setting the IPA in the pronunciation probability range as the substitution pronunciation variation of the phonetic alphabet.

8. The method of constructing a model of recognizing English pronunciation variations as claimed in claim 1, further comprising a step of analyzing the English expression to obtain an inference rule according to variation of the phonetic alphabet.

9. The method of constructing a model of recognizing English pronunciation variations as claimed in claim 8, further comprising:
corresponding the phonetic alphabets to pronunciation characteristics of linguistics;
analyzing the pronunciation variation network of the English expression, so as to obtain the inference rule; and
determining whether the phonetic alphabets having the same pronunciation characteristic have the same inference rule.

10. A non-transitory recording medium of constructing a model of recognizing English pronunciation variations, recording computer-readable computer program codes, used for recognizing English pronunciations with different intonations influenced by non-English native languages, the non-transitory recording medium encoding with computer program codes which is executed by a computer to perform a method of constructing a pronunciation variation model comprising:

1) providing a plurality of English expressions and at least one phonetic alphabet corresponding to each of the English expressions by the non-transitory recording medium, and collecting a plurality of corresponding sound information according to the phonetic alphabet of each of the English expression by the computer;

2) corresponding the phonetic alphabets of the non-English native language and English to a plurality of international phonetic alphabets (IPAs) by the computer, so as to form a plurality of pronunciation models, wherein the computer forms each pronunciation models:

2-1) collecting a plurality of phonetic alphabet pronunciations directed to one of the IPAs, and converting each of the phonetic alphabet pronunciations into a corresponding characteristic value;

2-2) forming the characteristic values into a value group and calculates a grouping threshold value corresponding to the characteristic values;

2-3) calculating a mean value of the value group;

2-4) obtaining a first characteristic value from the value group which is away from the mean value by a maximum numerical distance;

2-5) calculating a second characteristic value in the value group which is away from the first characteristic value by a maximum numerical distance;

2-6) calculating numerical distances, wherein a first distance is calculated between each characteristic value and the first characteristic value and a second distance is calculated between each characteristic value and the second characteristic value, and forming two value groups by the first distances and the second distances, one of the two value groups containing the characteristic values close to the first characteristic value and the other one of the two value groups containing the characteristic values close to the second characteristic value, respectively;

2-7) obtaining a within-group distance and a between-group distance of the two value groups, so as to calculate a grouping standard; and 2-8) determining whether the grouping standard is higher than the grouping threshold value through comparison, if yes, calculating each mean value of the two value groups and then, the step 2-4) to the step 2-8) are repeated for each one of the two value groups respectively, and if no, obtaining each value group of the pronunciation model that the computer want to form;

3) converting the sound information of each of the English expressions by using the pronunciation models, and constructing a pronunciation variation network corresponding to the English expression with reference to the phonetic alphabet of the English expression by the computer, so as to detect whether the English expression has a pronunciation variation path; and 4) summarizing each of the pronunciation variation paths to form a plurality of pronunciation variation rules by the computer.

11. The non-transitory recording medium as claimed in claim 10, wherein the characteristic values of at least one value group of the pronunciation model correspond to the phonetic alphabets of the non-English native language.

12. The non-transitory recording medium as claimed in claim 10, wherein the characteristic values of at least one value group of the pronunciation model correspond to the phonetic alphabets of the English.

13. The non-transitory recording medium as claimed in claim 10, wherein the phonetic alphabet pronunciation is transformed into the characteristic value by using Fourier Transform equation.

14. The non-transitory recording medium as claimed in claim 10, wherein the step of constructing a pronunciation variation network corresponding to the English expression comprises:
setting the phonetic alphabet of the English expression as a reference;
detecting whether an insertion pronunciation variation exists in each pronunciation of the phonetic alphabets of English;
detecting whether a deletion pronunciation variation exists between each phonetic alphabet and its next phonetic alphabet;
detecting a substitution pronunciation variation corresponding to each phonetic alphabet; and
constructing the pronunciation variation network.

15. The non-transitory recording medium as claimed in claim 14, wherein the step of detecting a substitution pronunciation variation corresponding to each phonetic alphabet comprises:
obtaining a pronunciation type in the IPA for each phonetic alphabet; and
using at least one IPA with the same pronunciation type as the substitution pronunciation variation of the phonetic alphabet.

16. The non-transitory recording medium as claimed in claim 14, wherein the step of detecting a substitution pronunciation variation corresponding to each phonetic alphabet comprises:
collecting pronunciations of the IPA;
calculating pronunciation probability for each IPA, so as to establish a phone confusion matrix;
obtaining at least one IPA in a pronunciation probability range based on the phonetic alphabet; and
setting the IPA in the pronunciation probability range as the substitution pronunciation variation of the phonetic alphabet.

17. The non-transitory recording medium as claimed in claim 10, further comprising a step of analyzing the English expression to obtain an inference rule according to the variation of the phonetic alphabet.

18. The non-transitory recording medium as claimed in claim 17, wherein the step of detecting a substitution pronunciation variation corresponding to each phonetic alphabet comprises:
corresponding the phonetic alphabets to pronunciation characteristics of linguistics;
analyzing the pronunciation variation network of the English expression, so as to obtain the inference rule; and
determining whether the phonetic alphabets having the same pronunciation characteristic have the same inference rule.

* * * * *